United States Patent [19]

Bershas et al.

[11] Patent Number: 4,868,267

[45] Date of Patent: Sep. 19, 1989

[54] AMINATED HYDROXYLATED POLYESTER POLYOL RESIN AND MOLDING COMPOSITIONS COMPRISED THEREOF

[75] Inventors: James P. Bershas, Newark, Ohio; Russell H. Tobias, Valparaiso, Ind.

[73] Assignee: Owens-Corning Fiberglas Corporation, Toledo, Ohio

[21] Appl. No.: 141,809

[22] Filed: Jan. 11, 1988

[51] Int. Cl.[4] .................... C08G 18/28; C08G 69/44
[52] U.S. Cl. ...................................... 528/73; 528/291
[58] Field of Search ................................ 528/73, 291

[56] References Cited

U.S. PATENT DOCUMENTS

| 3,234,153 | 2/1966 | Britain | 528/73 |
| 4,002,601 | 1/1977 | Hajek et al. | 528/73 |
| 4,507,463 | 3/1985 | Orban | 528/291 |

FOREIGN PATENT DOCUMENTS

| 5861 | 1/1981 | Japan | 528/73 |
| 7318 | 1/1986 | Japan | 528/73 |
| 143926 | 6/1987 | Japan | 528/73 |

Primary Examiner—John Kight
Assistant Examiner—Dennis R. Daley
Attorney, Agent, or Firm—Patrick P. Pacella; Ted C. Gillespie; Catherine B. Martineau

[57] ABSTRACT

A thermosetting resin composition comprising the product of an unsaturated polyester intermediate resin which is derived from the reaction of (a) an acid anhydride selected from the group including maleic acid anhydride or a mixture of maleic anhydride and a polyfunctional acid anhydride, a low molecular weight polyether polyol having a molecular weight of about 100 to about 600 selected from the group including diethylene glycol or a mixture of diethylene glycol and at least one other low molecular weight polyether polyol having a molecular weight of about 100 to about 600, and a lower alkylene oxide having from 2-4 carbon atoms; and, (b) a mono- or di-functional amino compound selected from the group including diethanolamine or a mixture of diethanolamine and at least one other mono- or di-functional amino compounds selected from the group including a primary or secondary amino alcohol or a primary or secondary diamine which contain isocyanate reactive groups attached to the nitrogen of the amino alcohol or diamine, the equivalent ratio of mono- or di-functional amino compound to unsaturated polyester intermediate resin being in the range from about 0.125 to about 0.5, such that a corresponding proportion of the unsaturated polyester intermediate resin remains unreacted and has a maleate functionality; (c) a morpholine compound; (d) a vinyl crosslinking compound; and (e) an isocyanate. The thermosetting resin compositions are especially useful in a reaction injection molding (RIM) process to prepare molded articles.

18 Claims, No Drawings

AMINATED HYDROXYLATED POLYESTER POLYOL RESIN AND MOLDING COMPOSITIONS COMPRISED THEREOF

This invention relates to aminated hydroxylated polyester polyol resins intended for use in a reaction injection molding (RIM) process.

BACKGROUND OF THE INVENTION

Polyester resins are well-known in the art. The polyester resins are used to form thermoset resins compositions which are especially useful in various molding applications. In particular, the reaction injection molding (RIM) process uses such resin compositions to make resin-reinforced fiberglass structures for use in automobile applications. The unsaturated polyesters resins are generally the poly condensation products of di-or polycarboxylic acids or their anhydrides and di-or polyhydroxylated alcohols or alkylene oxides. The unsaturated polyester resins are usually crosslinked through their double bonds with a compatible monomer also containing ethylenic unsaturation. The cross-linked resins are thus thermoset and when fully cured are insoluble and infusible. For example, the Dunnavant et al., U.S. Pat. No. 4,374,229 assigned to the Ashland Oil Co., discloses a moldable reactive acrylic resin based on logiomeric polyesters which are structurally linked through a urethane residue. The composition contains polyester segments containing internal ethylenic unsaturation terminally joined to one another through polyurethane linkages. Each of the polyesters segments possess end groups containing vinyl unsaturation. The compositions are copolymerized with a vinyl or polyallyl crosslinking agent.

Dunnavant et al. does not, however, suggest the achievement of low viscosity, hydroxylated, partially aminated polyester resins which are compatible with a polyisocyanate and which have an increase in functionality due to additional hydroxyl groups incorporated into the resin backbone.

SUMMARY OF THE INVENTION

The present invention comprises an improved high performance, low viscosity resin which is compatible with isocyanate. The resin of the present invention is especially useful as a structural RIM component for use in making fiber reinforced articles using conventional molding and related applications.

The resin of the present invention also provides a large increase in isocyanate reactive functionality with only a small increase in molecular weight of the resin and only a small increase in visocisty.

Another aspect of the invention provides an improved low viscosity resin which has improved heat distortion temperature properties.

The low viscosity, aminated, hydroxylated, polyester polyol resins contemplated herein comprises the product may be incorporating low molecular weight polyether polyol into a backbone structure to form unsaturated polyester intermediate resins. The Michael reaction is used to add mono- or di- functional amino compounds across the double bond of of the unsaturated polyester intermediate resins. Any residual primary or secondary amine in the backbone of the resin can react with isocyanates. The resulting polyurea containing compounds are useful in RIM applications.

In one of its more specific aspects, the invention relates to a thermosetting resin comprising a partially aminated, hydroxylated, polyester polyol resin prepared by the reaction of an acid anhydride with a low molecular weight polyether polyol to form a prepolymer. The acid anhydride is selected from the group including maleic acid anhydride or a mixture of maleic acid anhydride and another polyfunctional acid anhydride. The low molecular weight polyether polyol is selected from the group including diethylene glycol or a mixture of diethylene glycol and other polyether polyols, such as, for example, tetraethylene glycol, polyethylene glycol or polypropylene glycol. It is contemplated that other polyether glycols can be used within the scope of this invention. The prepolymer compound is reacted with a lower alkylene oxide to form an unsaturated polyester intermediate resin. A Michael addition reaction is used to add at least one mono- or di- functional amino compound across the double bonds on the unsaturated polyester intermediate resin. The mono- or di-functional amino compounds are selected from the group including diethanoalmine or a mixture of diethanolamine and a primary or secondary amino alcohol or a primary or secondary diamine which contains isocyanate reactive groups attached to the nitrogen of the alcohol or diamine.

The amount of mono- or di- functional amino compound which is reacted with the unsaturated polyester intermediate can be varied to meet the specific requirement of the application or end use. Typically the equivalent ratio of mono- or di-functional amino compound to unsaturated polyester intermediate resin is in the range of about .125 to about .5 and, preferrably about .25.

This invention is advantageous in that it provides a convenient means of preparing a variety of hydroxyated polyester polyol resin compositions.

In another of its specific aspects, the invention relates to reacting the polyol resins simultaneously with a polyisocyanate and with a suitable crosslinking agent such as, for example, styrene, divinyl benzene, or vinyl toluene. The unsaturated polyester resin is cross-linked, while the isocyanate reacts with hydroxyl groups on the polyester resins to form polurethanes.

This invention provides partially aminated, hydroxylated resin compounds which are especially useful for making thermoset molded articles. The resins are compatible with polyisocyanate compounds. The resins, when reacted with an isocyanate yield a urethane polymer which has high modulus and high impact resistance and is especially useful in structural reaction injection molding (RIM) applications.

The urethane polymers produced in accordance with the present invention are possessed of the combination of excellent physical properties such as high tensile strength, high flex modulus, good impact strength and the like.

Accordingly, the present polymers are especially useful in structural reaction injection molding (RIM) applications, wherein the urethane polymers are reinforced with fiberglass. Fiberglass reinforcement of urethane polymers is known to those skilled in the art. Particularly suitable fiberglass reinforcements include, for example, continuous strand glass fiber mat, such as, Owens-Corning Fiberglas M8610 mat, unidirectional or biaxial knitted fabric, such as Cofab ® A-1012, or preform mats, or the like. The molded products find particular utility as auto parts such as car bumpers, body elements, panels, doors, engine hoods, and the like.

In addition, the resins of the present invention, when reacted with an isocyanate compound and combined with glass fiber reinforcments, provide a thermosetting composition having a high heat deflection termperature in excess of about 400° F.

DESCRIPTION OF THE PREFERRED EMBODIMENTS

The compounds disclosed herein are formed by combining a polyfunctional acid anhydride with a low molecular weight polyether polyol to form a prepolymer. The prepolymer is thereafter reacted with a lower alkylene oxide to form an unsaturated polyester intermediate resin. The Micheal addition is used to add at least one mono- or di functional amino compound to the unsaturated polyester intermediate resin to form the partially aminated, hydroxylated, polyester polyol resin compound of the present invention.

In the preferred embodiments of the invention the polyfunctional acid anhydride comprises maleic anhydride. It is contemplated, however, that other acids or their anhydrides can be used in combination with the maleic acid anhydride in the practice of such embodiment. it is contemplated that the polyfunctional acids or their anhydrides, which are well-known in the art include poly-carboxylic acids which may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; titrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed. For example, a mixture of maleic acid anhydride and phthalic acid anhydride is especially useful. The ratio of maleic anhydride to phthalic anhydride can be in the range of from approximately 1:1 to about 2:1, respectively.

In the preferred embodiments of the invention the low molecular weight polyether polyol is selected from the group including diethylene glycol or a mixture of diethylene glycol and another polyether polyol. For example, in forming the prepolymer compound it is contemplated that partial replacement of the diethylene glycol with various other glycols can be used in the scope of this invention. The glycols are reacted with the polyfunctional acid anhydride and the diethylene glycol to form the prepolymer compounds. Examples of suitable polyhydric alcohols include ethylene glycol; 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bishydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethlyene glycol; dipropylene glycol; polypropylene glycols; dibutylene glycol; polybutylene glycols and the like. Various glycols which are especially useful are tetraethylene glycol, polyethylene glycol (average molecular weight of 300) or polypropylene glycol (average molecular weight of 425).

The prepolymer compounds are reacted with a lower alkylene oxide having from 2-4 carbon atoms to form the unsaturated polyester intermediate resin. In the preferred embodiments of the invention the prepolymer compounds are reacted with propylene oxide as the lower alkylene oxide.

The Michael addition reaction is used to add monoor di- functional amino compounds across the double bonds of the unsaturated polyester resins which thus results in an higher functionality in the polyol resin. The polyol resin reacts with a polyisocyanate to provide urethane compounds useful in in various molding processes.

In the preferred embodiments of the invention diethanolamine (DEA) is used either exclusively or as a portion of the mono- or di- functional amino compound component. It is contemplated however, that primarly and secondary amino alcohols and primarly and secondary diamines that contain isocyanate reactive groups attached to the nitrogen of the amino alcohol or diamine can be used with the DEA in the practice of this invention. These include, for example, diethanolamine, ethanolamine, hexamethylene diamine, m-xylylene diamine, or diethyltoluenediamine (DETDA).

In another embodiment of the invention the Michael addition reaction is used to add secondary and primary amines to a part of the unsaturated polyester resin. In a preferred embodiment, the Michael addition involves the reaction of the unsaturated polyester resin with diethanolamine in an equivalent ratio of from about .125 to about .50, and preferrably about .25, such that a corresponding proportion of the unsaturated polyester resin remains after the Michael addition. A morpholine compound is added to the resulting aminated, hydroxylated, polyester poyol resins and the unsaturated polyester resin, such that an unsaturated polyester polyol resin having a fumarate functionality is formed. The morpholine acts as an isomerization catalyst, to convert maleatetype unsaturated resins to fumarate-type unsaturated resins.

The resins of the present invention are combined with a suitable low viscosity, aromatic polyfunctional isocyanate commercially available and wellknown to those skilled in the art.

The polyisocyanates to be used in accordance with the present invention can be any of the organic di- or higher functionality polyisocyanates known to those skilled in the polyurethane art. The preferred class of polyisocyanates are the aromatic polyisocyanates. Illustrative, but not limiting thereof, are m- and p- phenylene diisocyanate, 2,4- and 2,6-toluene diisocyanate and mixtures of these two isomers, methylenebis(-phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 20 percent of the 2,4'-isomer) of 4,4'-methylenebis-(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquified forms of 4,4'-methylenebis(-phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof. Particularly useful is a Dow Chemical proprietary modified methyl disphenyl isocyanate product known as Isonate 143L®, to form a thermosetting resin composition especially useful in the reaction injection molding (RIM) process. The molding process generally includes two reactive sides: Side A comprising the polyfunctional isocyanate and free radical promoter, such as, for example, tertiary-butyl perbenzoate, and side B comprising the resin and optionally, further low molecular weight polyether polyol and suitable commercially available polyisocyanate and polyurethane and trimerization catalyst well-known to those skilled in the art, such as, for example Polycat® 43 and a tin salt such as dibutyltin dilaurate (DBTDL). However, various other catalyst can be employed in the present process. Such catalysts include, for example, organic and inorganic acid salts of, and organometallic derivatives of bismuth, tin, lead, antimony, cobalt, and the like, as well as phosphines and tertiary organic amines. A preferred group of such catalyst include stannous octoate, stannous oleate, dibutyltin diacetate, dibutyltin dioctoate, dibutyltin dilaurate, dibutyltin maleate, dibutyltin mercaptopropionate, dibutylin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination. The two sides are reacted under pressure and thereafter immediately injected into a mold. The reaction of sides A and B is completed within a few minutes and the molded article is removed from the mold.

The resins having the fumarate functionality are crosslinked with at least one compound used to crosslink unsaturated polyester resins, including, for example, vinyl crosslinking compounds such as styrene, divinyl benzene, vinyl toluene, diisopropyl benzene, tertiary butyl styrene, p-methyl styrene or gmmamethyl styrene. The use of the crosslinking compound in a RIM resin system reduces resin viscosity and also makes the polyol resins compatible with the isocyanate.

When a combination of the aminated resins and the partially aminated resins are used with a crosslinking compound in a RIM molding application, the resulting compound has greatly increased heat distortion temperatures. In a preferred embodiment the crosslinking compound comprises styrene to give compounds having heat distortion temperatures over 400° F. These RIM formulations include tertiary-butyl perbenzoate and a cobalt naphthenate promoter to initiate the crosslinking reactions. In addition, other free radical catalysts, such as azobisisobutylnitrile can also be used to achieve faster vinyl cure rates. For example, the styrene levels can vary from about 15 to about 30 percent. In a preferred embodiment the percentage of styrene is about 25% to about 75%, by weight, of the resin.

While the above describes the present invention with sufficient particularity to enable those skilled in the art to make and use the same, nonetheless the following illustrative working examples are set forth.

EXAMPLE 1

A resin kettle was equipped with a mechanical stirrer, thermometer, reflux condenser, dropping funnel, gas inlet tube, and gas exit tube. The kettle was charged with solid maleic acid anhydride and placed under a slow nitrogen gas sweep and heated to about 75° C. to melt the anhydride. When this temperature was reached, the mechanical stirrer was turned on and the dropping funnel filled with diethylene glycol (mole ratio of maleic anhydride/diethylene glycol = 1.05:1). The glycol was added dropwise to the kettle. During the addition, a reaction exotherm caused by the opening of the anhydride rings served to raise the temperature above 100° C. At this point, the rate of addition of glycol was adjusted so that the pot temperature remained between 105–110° C. Once the addition was complete, the resin acid number was checked to verify structure I below

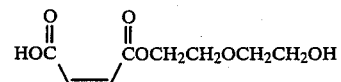

EXAMPLE 2

Resin I was charged into a pressurized autoclave and dewatered at 100° C. under a vacuum of 27 inches of mercury. The vacuum was released and magnesium hydroxide catalyst (.075 percent by weight) was charged into the reactor. Stirring was started and the vessel sealed under pressure and heated to approximately 149° C. Propylene oxide was injected into the stream at a rate such that the back pressure did not exceed 50 psi. The reaction was followed by acid number titration and finished when this valve was ≦1.0. Excess propylene oxide was removed by cooling to 65° C. and applying 27 inches mercury vacuum for 2 hours. The resin was then dewatered in a vacuum oven at 70° C. for two hours at approximately 30 inches mercury vacuum. The reaction can be summarized as follows:

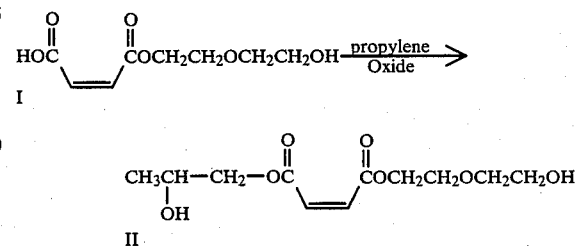

EXAMPLE 3

The resultant product, II, was reacted with diethanolamine (DEA) in the following way:

A resin kettle was prepared and equipped as noted above. II (1.0 mole) was charged into the vessel and the nitrogen gas blanket was turned on. Agitation was started and the temperature adjusted to 105° C. DEA (.23 moles) was added dropwise at a rate such that a pot temperature of 105–110° C. was maintained. The mixture was stirred for one hour at 105° C. following the completion of addition and a sample withdrawn and analyzed by NMR for maleate: fumarate ratio. The maleate form is represented by II above while the fumarate is shown in Structure III below.

Addition of a catalytic amount of morpholine (.021 moles) served to isomerize II to III. This occurred after 30 minutes at 80° C. The latter is favored by those skilled in the art because fumarates give better physical properties than maleates after crosslinking. The final product mix after addition of DEA was III, IV, and/or V.

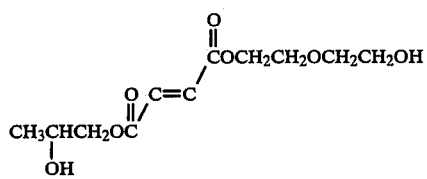

III

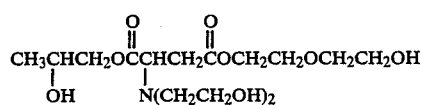

IV

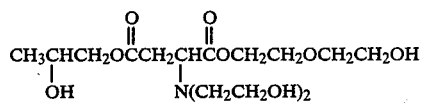

V

A typical formation used to mold glass fiber reinforced structural RIM panels is as follows:

TABLE 1

| Material | Amount | Comments |
|---|---|---|
| Isocyanate (A) Side | | |
| Isonate ® 143L | 5000 grams | Carbodiimide modified diphenylmethane diisocyanate available from Dow Chemical |
| Tertiary butyl Perbenzoate (tBpB) | 150 grams | vinyl initiator catalyst |
| Poly (B) Side | | |
| Partially aminated hydroxylated, polyester polyol resin of Example 3 | 5000 grams | |
| Styrene | 1250 grams | Vinyl crosslinking compound |
| Dibutyltin dilaurate | 18.75 grams | Urethane catalyst available from Air Products Co. |
| Pep 183-S | 50 grams | Cobalt Naphthenate promoter available from Air Products Co. |
| Hydroquinone | 125 grams | Inhibitor to prevent polymerization of styrene |

The temperature in the Isocyanate (A side) tank and in the resin (B side) tanks were approximately 80° F. and the mold temperature was approximately 200° F. Sides A and B were mixed and injected into the heated mold using RIM processing technology well-known to these skilled in the art. Prior to injection, appropriate glass fiber reinforcement members were preplaced in the mold.

EXAMPLE 5

This example serves to illustrate the physical properties associated with glass fiber reinforced products impregnated with the partially aminated, hydroxylated, polyester polyol resin. Test specimens were prepared in a conventional manner for use in applicable testing procedures. The details of the results of the various test products together with the data obtained are in accordance with standard ASTM testing procedure and are set forth in the following Table II.

TABLE II

| | Reinforcement with Continuous Strand Glass Fiber Mat | | | |
|---|---|---|---|---|
| Glass Fiber | M8608 | M8610 | M8608 | M8610 |
| % Glass | 35 | 36 | 53 | 53 |
| Tensile Strength PSI | 24,600 | 22,100 | 32,700 | 35,600 |
| Flexural Strength PSI | 42,000 | 42,100 | 50,000 | 55,200 |
| Tensile Modulus PSI | 1,570,000 | 1,480,000 | 2,330,000 | 2,290,000 |
| Flexural Modulus PSI | 1,302,000 | 1,343,000 | 1,866,000 | 1,749,000 |
| Elongation (%) | 2.2 | 2.1 | 2.4 | 2.3 |
| HDT - °F., 264 psi | 396 | 426 | 466 | 476 |
| Notched Izod Impact Ft-Lbs/In. | 14.8 | 13.2 | 22.0 | 17.0 |
| Density (g/cc) | 1.36 | 1.43 | 1.60 | 1.60 |

TABLE III

| | Reinforcement with Continuous Strand Mat/Unidirectional Knitted Glass Combinations | | | |
|---|---|---|---|---|
| Properties Fiberglass | XOXXOOX 54 | | XOOXOOX 54 | |
| % Fiberglass | A | E | A | E |
| Flexural Modulus (PSI) | 2,085,000 | 1,410,000 | 1,855,000 | 1,363,800 |
| Flexural Strength (PSI) | 70,600 | 33,900 | 75,500 | 36,400 |
| Tensile Strength (PSI) | 57,600 | 23,200 | 78,200 | 16,300 |
| Tensile Modulus (PSI) | 2,850,000 | 1,830,000 | 3,340,000 | 1,740,000 |
| Elongation (%) | 2.62 | 2.49 | 2.78 | 1.99 |
| Heat Distortion Temp. (°F., 264 PSI) | 441 | 340 | 451 | 335 |
| Notched Izod Impact (Ft Lbs/inch) | 48.3 | 13.8 | 57.9 | 13.5 |
| Density | 1.62 | | 1.63 | |

X = Continuous Strand Fiberglass Mat
A = Sample Cut Parallel to Warp
O = Knitted Glass COFAB (Warpfab-12 ounces)
E = Sample Cut Perpendicular to Warp

EXAMPLE 6

The following is an example comprising a mixture of styrene and divinylbenzene as crosslinking compounds for the fumarate units of partially aminated, hydroxylated, polyester polyol resins described in Example 3.

| Material | Amount |
|---|---|
| Isocyanate (A) Side | |
| Isonate ® 143L | 4000 grams |
| t-butyl perbenzoate | 180 grams |
| Polyol (B) Side | |
| Partially aminated, hydroxylated, polyester polyol resin of Example 3 | 4000 grams |
| Styrene | 600 grams |
| Divinyl benzene | 400 grams |
| Dibutyltin dilaurate | 15 grams |
| Pep 183-S | 50 grams |

The molding conditions described in Example 5 above were followed.

EXAMPLE 7

This example serves to illustrate the physical properties associated with glass fiber reinforced products impregnated with the partially aminated, hydroxylated, polyester polyol resin and crosslinked with a mixture of styrene/divinyl the details of the results of the various tested products together with the data obtained are in accordance with standard ASTM testing procedures and are set forth in the following Table IV.

TABLE IV

Use of Styrene/Divinyl Benzene Mixtures as Crosslinking Compounds for Partially Aminated, Hydroxylated, Polyester Polyols

| Glass Fiber<br>% Glass | M8610<br>38 | Test Method |
|---|---|---|
| Tensile Strength, psi | 20,100 | ASTM D638 |
| Flexural Strength, psi | 38,800 | ASTM D790 |
| Tensile Modulus, psi | 1,470,000 | ASTM D638 |
| Flexural Modulus, psi | 1,470,000 | ASTM D790 |
| Elongation (%) | 1.90 | ASTM D638 |
| HDT - °F., 264 psi | 439 | ASTM D648 |
| Notched Izod Impact Ft/Lbs/In. | 11.6 | ASTM D256 |
| Density (grams/cc) | 1.53 | |

It has been found that 100% styrene at 25% weight/weight with the partially aminated, hydroxylated, polyester polyol of Example 3 is an especially useful product. However, a percent by weight range of styrene to resin can range from about 10 to about 30 percent. It is also contemplated that mixtures of styrene and vinyl toluene (up to about 50:50 blend by weight) can be practiced within the scope of this invention.

While the above describes the present invention, it will of course be apparent that modifications are possible which, pursuant to the patent laws and statutes, do not depart from the spirit and scope thereof.

We claim:

1. A thermosetting resin composition comprising the product of a reaction of:
   (a) an unsaturated polyester intermediate resin comprised of the reaction of an acid anhydride selected from the group consisting of maleic acid anhydride, a mixture of maleic acid anhydride and a polyfunctional acid anhydride; a low molecular weight polyether polyol having a molecular weight of about 100 to about 600 selected from the group consisting of diethylene glycol, a mixture of diethylene glycol and at least one other low molecular weight polyether polyol having a molecular weight of about 100 to about 600; and, a lower alkylene oxide having from 2-4 carbon atoms;
   (b) a mono- or di-functional amino compound selected from the group consisting of diethanolamine, a mixture of diethanolamine and one or more mono- or di- functional amino compounds selected from the group consisting of a primary or secondary amino alcohol, a primary or secondary diamine which contain isocyanate reactive groups attached to the nitrogen of the amino alcohol or diamine, the equivalent ratio of mono- or di- functional amino compound to unsaturated polyester intermediate resin being in the range of about .125 to about .5, such that a corresponding proportion of the unsaturated polyester intermediate resin remains unreacted and has a maleate functionality, wherein the product of (a) and (b) provides a corresponding proportion of a partially aminated, hydroxylated, polyester polyol resin and a corresponding proportion of an aminated, hydroxylated polyester polyol resin;
   (c) a morpholine compound;
   (d) at least one vinyl crosslinking compound; and,
   (e) an isocyanate.

2. The thermosetting composition of claim 1, wherein the vinyl crosslinking compound is selected from the group consisting of styrene, divinyl benzene, vinyl toluene, diisopropyl benzene, tertiary butyl styrene, p-methyl styrene or gamma-methyl styrene.

3. The thermosetting composition of claim 2 wherein the vinyl crosslinking compound consists essentially of styrene.

4. The thermosetting composition of claim 2, wherein the vinyl crosslinking compound consists essentially of a mixture of styrene and divinyl benzene in the ratio of approximately 3:2, respectively.

5. The thermosetting composition of claim 4, wherein the ratio of partially aminated, hydroxylated, polyester resin to unsaturated polyester intermediate resin to styrene to divinyl benzene is approximately 40:40:12:8, respectively.

6. The thermosetting resin composition of claim 5, wherein the mono- or di-functional amino compound is present in the equivalent ratio of approximately from about .125 to about .50.

7. The thermosetting resin composition of claim 6, wherein the acid anhydride consisting essentially of maleic acid anhydride.

8. The thermosetting resin composition of claim 7, wherein the low molecular weight polyether polyol consists essentially of diethylene glycol.

9. The thermosetting resin composition of claim 8, wherein the ratio of maleic acid anhydride to diethylene glycol is approximately 1:1, respectively.

10. The thermosetting resin composition of claim 9, wherein the lower alkylene oxide consists essentially of propylene oxide.

11. The thermosetting resin composition of claim 10, wherein the mono- or di- functional amino compound consists essentially of diethanolamine.

12. The thermosetting resin composition of claim 1, wherein the mono- or di- functional amino compound consists essentially of a mixture of diethanolamine and at least one mono- or di- functional amino compounds selected from the group consisting of a primary of secondary amino alcohol or a primary or secondary diamine containing isocyanate reactive groups attached to the nitrogen of the amino alcohol or diamine.

13. The thermosetting resin composition of claim 12, wherein the mono- or di- functional amino compound consists essentially of ethanolamine.

14. The thermosetting resin composition of claim 12, wherein the mono- or di- functional amino compound consists essentially of hexamethylene diamine.

15. The thermosetting resin composition of claim 12, wherein the mono- di- functional amino compound consists essentially of m-xylylene diamine.

16. The thermosetting resin composition of claim 12, wherein the ratio of diethanolamine to other mono- or di- functional amino compound ranging from approximately 1.0 to about 0.1 - 0.5, respectively.

17. The thermosetting resin composition of claim 1, wherein the isocyanate and the resin are combined in a coupling reaction in a ratio of approximately 0.8:1 to about 4.0:1, isocyanate to resin, respectively.

18. The thermosetting resin composition of claim 17, wherein the isocyanate is a low viscosity aromatic polyfunctional isocyanate.

* * * * *